(12) United States Patent
Schalk et al.

(10) Patent No.: US 11,685,111 B2
(45) Date of Patent: Jun. 27, 2023

(54) THREE-DIMENSIONAL PRINTER

(71) Applicant: HEWLETT-PACKARD DEVELOPMENT COMPANY, L.P., Houston, TX (US)

(72) Inventors: Wesley R. Schalk, Vancouver, WA (US); Kris M. English, Vancouver, WA (US); Justin M. Roman, Vancouver, WA (US); Kevin E. Swier, Corvallis, OR (US); David Otis, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 875 days.

(21) Appl. No.: 16/075,603

(22) PCT Filed: Apr. 21, 2017

(86) PCT No.: PCT/US2017/028829
§ 371 (c)(1),
(2) Date: Aug. 4, 2018

(87) PCT Pub. No.: WO2018/194652
PCT Pub. Date: Oct. 25, 2018

(65) Prior Publication Data
US 2021/0206078 A1    Jul. 8, 2021

(51) Int. Cl.
*B29C 64/153*    (2017.01)
*B33Y 10/00*    (2015.01)
(Continued)

(52) U.S. Cl.
CPC ............ *B29C 64/153* (2017.08); *B22F 10/28* (2021.01); *B22F 10/73* (2021.01); *B22F 12/38* (2021.01);
(Continued)

(58) Field of Classification Search
CPC ... B29C 64/153; B29C 64/259; B29C 64/357; B29C 64/255; B22F 10/70; B22F 10/73
See application file for complete search history.

(56) References Cited

U.S. PATENT DOCUMENTS

| 5,252,264 A | * | 10/1993 | Forderhase | ........... B29C 64/153 |
|---|---|---|---|---|
| | | | | 156/272.8 |
| 6,554,600 B1 | * | 4/2003 | Hofmann | ................ B29C 41/34 |
| | | | | 425/182 |

(Continued)

FOREIGN PATENT DOCUMENTS

| CA | 2996041 A1 | 3/2017 |
|---|---|---|
| CN | 101067721 A | 11/2007 |

(Continued)

OTHER PUBLICATIONS

"3D Systems' Cube 3 and CubePro 3D printers available to pre-order, starting at $999", 3D Printer and 3D Printing News, Retrieved from Internet: http://www.3ders.org/articles/20140521-3d-systems-cube-3-and-cubepro-3d-printers-available-to-pre-order.html, 2014, 12 pages.

(Continued)

*Primary Examiner* — Joseph S Del Sole
*Assistant Examiner* — Ariella Machness
(74) *Attorney, Agent, or Firm* — Shook, Hardy & Bacon L.L.P.

(57) ABSTRACT

A three-dimensional (3D) printer includes a selective solidification module to selectively solidify portions of successive layers of a build material on a build platform. The 3D printer also includes a cartridge receiver to hold a removable material cartridge that accepts material from the 3D printer and makes material available to the 3D printer for printing of the 3D object.

9 Claims, 7 Drawing Sheets

(51) Int. Cl.
   *B33Y 30/00* (2015.01)
   *B33Y 40/00* (2020.01)
   *B29C 64/321* (2017.01)
   *B29C 64/259* (2017.01)
   *B29C 64/357* (2017.01)
   *B22F 10/28* (2021.01)
   *B22F 10/73* (2021.01)
   *B22F 12/00* (2021.01)

(52) U.S. Cl.
   CPC .......... *B29C 64/259* (2017.08); *B29C 64/321* (2017.08); *B29C 64/357* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 7,828,022 B2 | 11/2010 | Davidson et al. | |
| 7,887,316 B2 | 2/2011 | Cox | |
| 8,798,780 B2 | 8/2014 | Menchik et al. | |
| 9,821,543 B1* | 11/2017 | Crear | B33Y 40/00 |
| 2001/0045678 A1* | 11/2001 | Kubo | B29C 64/35 |
| | | | 264/37.29 |
| 2005/0179750 A1 | 8/2005 | Hayasaki et al. | |
| 2006/0214335 A1* | 9/2006 | Cox | B01F 5/10 |
| | | | 264/497 |
| 2010/0155985 A1 | 6/2010 | McAlea et al. | |
| 2010/0247703 A1 | 9/2010 | Shi | |
| 2014/0265034 A1 | 9/2014 | Dudley | |
| 2014/0265048 A1* | 9/2014 | Burris | B29C 64/153 |
| | | | 264/497 |
| 2015/0298397 A1 | 10/2015 | Chen et al. | |
| 2017/0021420 A1 | 1/2017 | Buller et al. | |
| 2017/0057163 A1* | 3/2017 | Chaplin | B29C 64/357 |
| 2017/0072466 A1 | 3/2017 | Zehavi et al. | |
| 2017/0120536 A1* | 5/2017 | Brunermer | B29C 64/153 |

FOREIGN PATENT DOCUMENTS

| | | | | |
|---|---|---|---|---|
| CN | 104191613 A | 12/2014 | | |
| CN | 105383059 A | 3/2016 | | |
| CN | 205272601 U | 6/2016 | | |
| CN | 105818372 A | 8/2016 | | |
| CN | 105855548 A | 8/2016 | | |
| EP | 1296788 B1 | 1/2005 | | |
| EP | 1700686 B1 | 7/2015 | | |
| EP | 2921286 A1 | 9/2015 | | |
| JP | 2015196205 A | 11/2015 | | |
| WO | WO-9534468 A1 | 12/1995 | | |
| WO | WO2014/032895 A1 | 3/2014 | | |
| WO | 2016131785 A1 | 8/2016 | | |
| WO | 2017011456 A1 | 1/2017 | | |
| WO | WO-2017009831 A1 | 1/2017 | | |
| WO | WO-2017011456 A1 * | 1/2017 | | B28B 1/001 |
| WO | WO-2017034951 A1 | 3/2017 | | |

OTHER PUBLICATIONS

"ProX™ 500 3D Production Printer", 3D Systems, Retrieved from Internet: http://infocenter.3dsystems.com/product-library/system/files/common/2602_MM_ProX%20500%20User%20Guide%20(Part%20No.%20134012-00%2C%20Rev.%20E).pdf, 2015, 69 pages.

\* cited by examiner

200

THREE-DIMENSIONAL PRINTER

BACKGROUND

Three-dimensional (3D) printing may produce a 3D object. In particular, a 3D printer may add successive layers of material under computer control to produce the 3D object.

DESCRIPTION OF THE DRAWINGS

Certain examples are described in the following detailed description and in reference to the drawings, in which.

DETAILED DESCRIPTION

Figure 1:
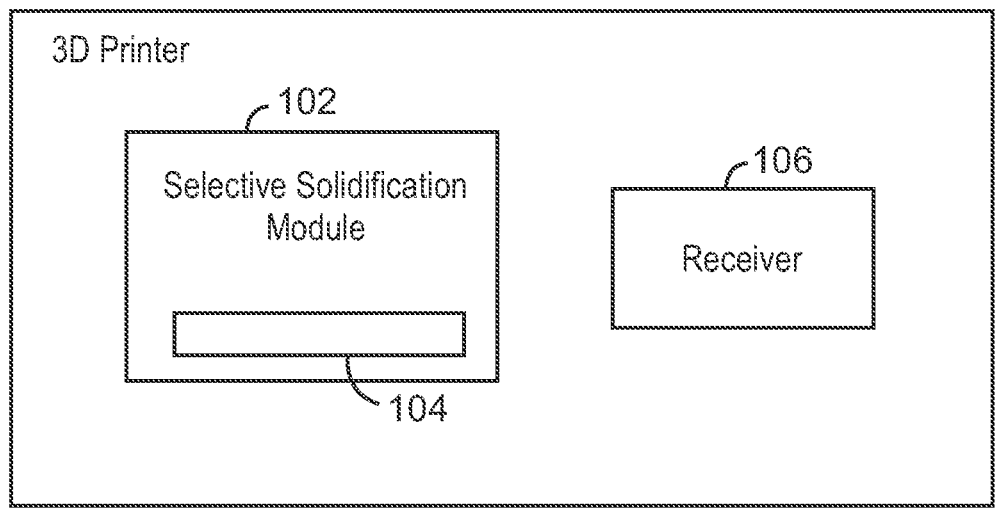
FIG. 1 is a block diagram of a 3D printer in accordance with examples of the present techniques.

Techniques for handling of 3D printer recyclable build material are discussed herein. A 3D printer may include a build enclosure. The build enclosure may include a build platform on which the 3D printer forms a 3D object. The 3D printer may also include a cartridge receiver that holds a material cartridge. The material cartridge may be an enclosure to contain the material. The cartridge receiver may be a cavity, receptacle, slot, sleeve, or any combination thereof. The 3D printer forms the 3D object from the material. The material may be metal, plastic, polymer, glass, ceramic, or other suitable material. The material cartridge may receive material from the 3D printer and make material available to the 3D printer for printing of the 3D object.

The techniques discussed herein may also apply to non-recyclable build material. Non-recyclable build material may be waste material that cannot be reused in the printing process. The techniques discussed herein may provide a way to cleanly remove waste material from a 3D printer.

A 3D printer may have one or more cartridge receivers to receive material cartridges, a selective solidification module, and a processing module to separate printed objects from unfused powder. The 3D printer may also include a recovery zone from which 3D objects may be recovered after removal of the unfused material. One of the cartridge receivers may receive a first cartridge containing new material. Another cartridge receiver may receive a second cartridge containing recycle material or may receive an empty cartridge to collect unfused recycle or waste build material to facilitate removal of material from the 3D printer. Recycle material may be excess material from the build enclosure that was not used during the present or previous printing processes. Recycle material may also be referred to as reclaimed material, recycled material, used material, etc.

Recycle material cartridges may be removed and stored for future use or discarded. Once a fresh material cartridge has been emptied by the 3D printer, the empty fresh material cartridge may be inserted into the second cartridge receiver to receive unfused recycle material. The 3D printer may include a plurality of vessels to store fresh or recycle material received from either the material cartridges or the build enclosure. The vessels may be removed from the 3D printer and emptied. Alternatively, the vessels may be emptied by feeding the build enclosure. If the vessels are filled with material, the 3D printer may operate without the insertion of material cartridges. The material cartridges may be rotated within the 3D printer to de-aggregate material that has been stored for extended periods of time in the 3D printer.

Certain examples of a 3D printer designed to receive a material cartridge may have one or multiple material cartridge slots. If a single slot is present, the slot may be used to both provide material to the 3D printer and remove material from the 3D printer. In particular examples, the 3D printer may have two slots, one for "new" material and a second for "recycle" material. Other examples may have more than two slots for material cartridges, or a single slot for a material cartridge. The new or fresh material slot may hold a material cartridge that supplies or otherwise provides material to the build enclosure for printing of the 3D object. In contrast, the recycle material slot may hold a material cartridge that receives material from the 3D printer. The material entering the material cartridge in the recycle material slot may be surplus material left over or otherwise not used in the printing of the 3D object. When a new material cartridge is fully depleted, e.g., when the 3D printer has consumed the cartridge's contents, the material cartridge may be removed by the user and re-purposed for later use in the recycle material slot. In one example, the empty cartridge as a recycle material cartridge in a slot or in a recycle material slot may receive unused powder from the printer during and/or at the conclusion of a print job. The material cartridge in the recycle material slot containing recycle material may then supply or otherwise provide recycle material for printing. Yet again, other examples of 3D printers may have multiple slots for material cartridges.

User removal of the emptied new material cartridge may generally occur soon or immediately after emptying, so the 3D printer can be replenished with more new material from a new material cartridge. However, the re-installation or re-use of the empty and now "recycle" cartridge may not occur for some time. The empty recycle cartridge may be stored until recycle material has to be received from the 3D printer. In other words, the user may retain this recycle cartridge for future use. Indeed, the user may store many of the empty recycle cartridges. The 3D printer may request the user to re-install an empty or not completely full recycle cartridge in a slot or the recycle material slot. Moreover, multiple material types may be employed by a 3D printer at different times and therefore labels, markings, indicators, or other techniques may facilitate accounting of recycle material types in the recycle cartridges.

As indicated, a purpose of the recycle material cartridge and any associated slot in the 3D printer may be to receive excess material from the build enclosure generated during the print process and therefore facilitate clean and contained offloading of excess material. In other words, a recycle cartridge in the single slot or the second slot of the 3D printer may receive excess material from the build enclosure during or after printing. Full recycle cartridges may concurrently supply recycle material to the build enclosure, or be removed for future use, and the like. Some of these cartridges full of recycle material may remain in place or be discarded. Some of these recycle cartridges filled with recycle material may be removed and kept for future use such as when the 3D printer is short of recycle material, e.g., when the recycle material may be mixed with new material and consumed during printing. In certain examples of a 3D printer with a single slot for a material cartridge, a new material cartridge may be inserted in the slot and have the contents thereof emptied into an internal storage vessel. The cartridge could then become a recipient for recycle material.

FIG. 1 is a block diagram of a 3D printer in accordance with examples of the present techniques. The 3D printer 100 may include a selective solidification module 102 to selectively solidify portions of successive layers of a build material on a build platform 104. The selective solidification module 102 may be disposed over a build enclosure. Together, the build enclosure and the build platform 104 may constitute a build unit. The build unit may be removable. The 3D printer may also include a cartridge receiver 106 to hold a material cartridge. The cartridge receiver 106 may be a cavity, a receptacle, a slot, a sleeve, or any combination thereof. The material cartridge may be an enclosure to contain the material. The material cartridge may accept excess material from the build enclosure and make material available to the build enclosure for printing of the 3D object. Alternatively, material stored in an internal storage container may be fed to the build enclosure. The printing of the 3D object may involve the formation of the 3D object from the material in the material cartridge. The material may be a powder composed of plastic, polymer, metal, glass, ceramic, or any combination thereof.

The 3D printer 100 may include a feed vessel to receive the material made available by the material cartridge. A powder spreader may receive the material from the feed vessel and disperse the material across a surface of the build platform 104 in the build enclosure. An energy source, such as a light source or a laser, may fuse the material on the build platform 104 to form a first layer of a 3D object. The powder spreader may disperse more material across the surface of the build platform 104. The additional material may be fused to form a second layer of the 3D object. This process may continue until the 3D object is completely formed.

The cartridge receiver 106 may be a recycle cartridge receiver. As such, the material cartridge may be a recycle material cartridge. The recycle material cartridge may contain recycle material. Recycle material may be unfused material left over or otherwise unused in the 3D printing process. The recycle material cartridge may provide recycle material to the build enclosure. In the build enclosure, a 3D object is formed from the recycle material.

Figure 2:
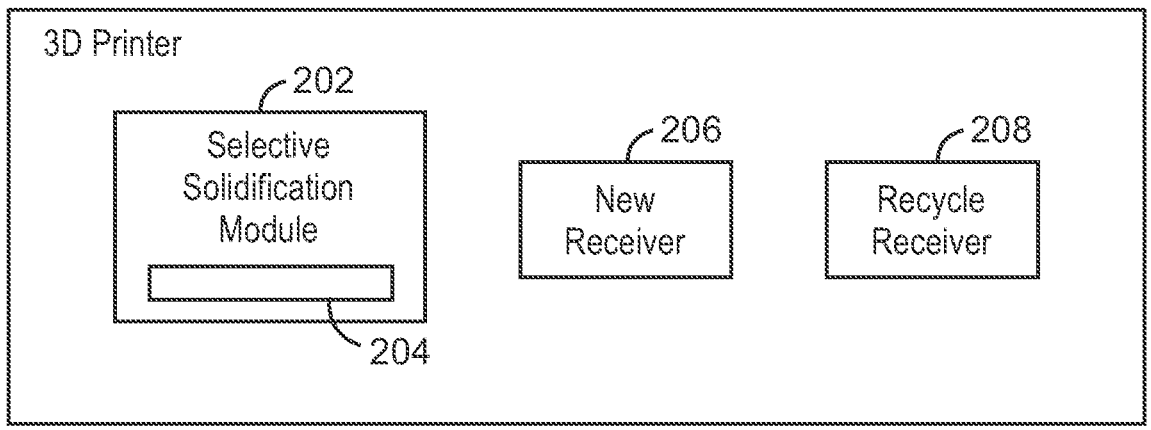
FIG. 2 is a block diagram of a 3D printer in accordance with examples of the present techniques.

FIG. 2 is a block diagram of a 3D printer in accordance with examples of the present techniques. The 3D printer 200 may include a selective solidification module 202 to selectively solidify portions of successive layers of a build material on a build platform 204. The 3D printer 200 may include a new cartridge receiver 206 to hold a new material cartridge. The new material cartridge makes new material available to a build enclosure for printing of a 3D object. The printer 200 may also include a recycle cartridge receiver 208 to hold a recycle material cartridge. The recycle material cartridge may make recycle material available to the build enclosure for printing of the 3D object. The 3D printer 200 may feed new material and recycle material to the build enclosure at a specified weight or volume ratio of new material to recycle material. The ratio may range from zero, e.g., no new material, all recycle material, to 1.0, e.g., all new material, no recycle material. For example, the ratio may range from 0.01 to 0.99, 0.05 to 0.95, 0.1 to 0.9, 0.15 to 0.85, 0.2 to 0.8, 0.25 to 0.75, 0.3 to 0.7, etc. In particular, the feed to the build enclosure may contain 20% new material and 80% recycle material, yielding a weight or volume ratio of 0.25.

Figure 3:
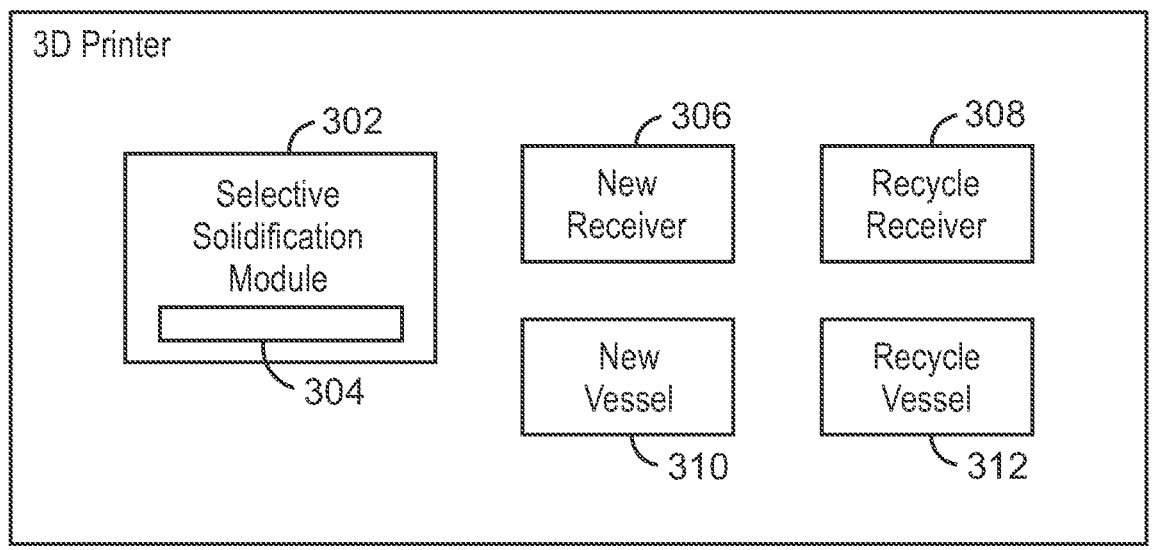
FIG. 3 is a block diagram of a 3D printer in accordance with examples of the present techniques.

FIG. 3 is a block diagram of a 3D printer in accordance with examples of the present techniques. The 3D printer 300 may include a selective solidification module 302 to selectively solidify portions of successive layers of a build material on a build platform 304. The 3D printer 300 may also include a new cartridge receiver 306 to receive a new material cartridge and a recycle cartridge receiver 308 to receive a recycle material cartridge. An internal new material vessel 310 may be disposed near the new cartridge receiver 306 and may receive new material from the new material cartridge in the new cartridge receiver 306. Likewise, a recycle material vessel 312 may be disposed near the recycle cartridge receiver 308 and may receive recycle material from the recycle material cartridge in the recycle cartridge receiver 308. The new material and recycle material may be gravity fed or conveyed to the new material vessel 310 and the recycle material vessel 312.

Figure 4:
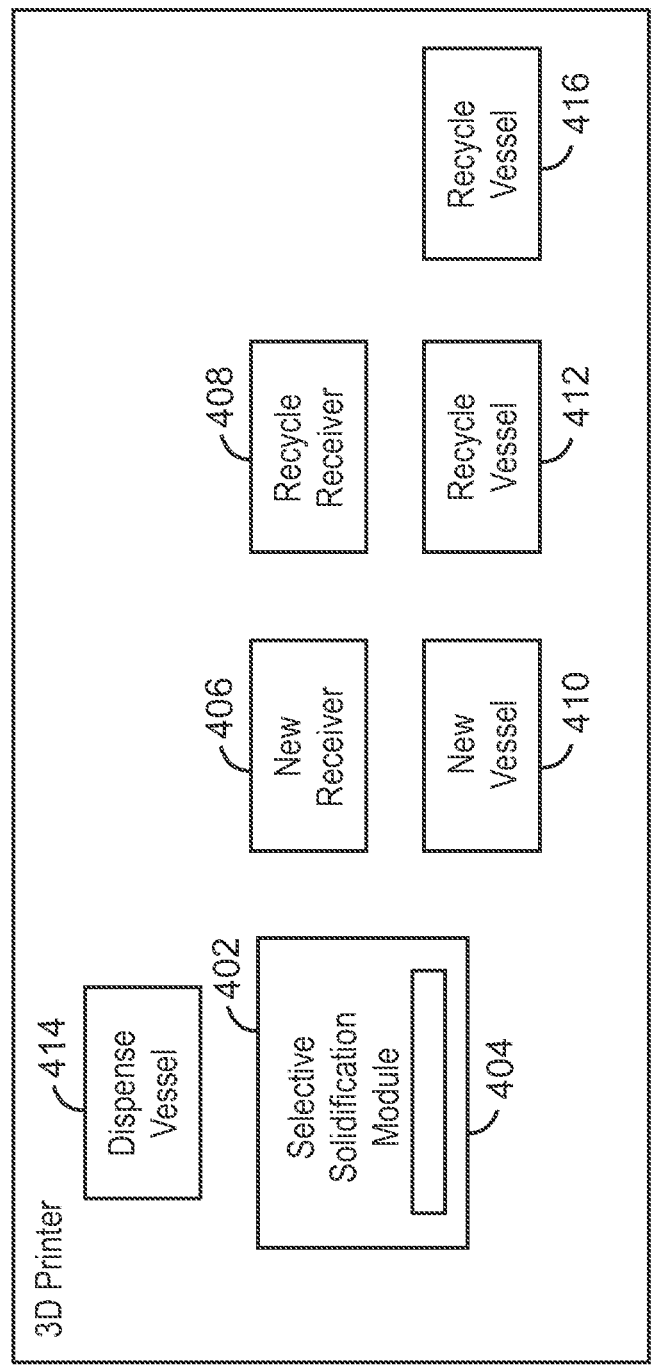
FIG. 4 is a block diagram of a 3D printer in accordance with examples of the present techniques.

FIG. 4 is a block diagram of a 3D printer in accordance with examples of the present techniques. The 3D printer 400 may include a selective solidification module 402 to form a 3D object on a build platform 404 from feed material comprising new material and recycle material. The 3D printer 400 may include a new cartridge receiver 406 and a recycle cartridge receiver 408. A new material cartridge inserted into the new cartridge receiver 406 may feed the new material vessel 410. Similarly, a recycle material cartridge inserted into the recycle cartridge receiver 408 may feed the recycle material vessel 412. The new material in the new material vessel 410 and the recycle material in the recycle material vessel 412 may be fed to a dispense vessel 414 disposed above the selective solidification module 402. A conveyance system may convey the new material from the new material vessel 410 and the recycle material from the recycle material vessel 412 to the dispense vessel 414. The conveyance system may be a pneumatic conveyance system, a mechanical conveyance system, by gravity, by vacuum, etc. The dispense vessel 414 may supply the new material and the recycle material to the selective solidification module 402.

The 3D printer 400 may contain a second recycle vessel 416. The second recycle vessel 416 may receive recycle material if the first recycle vessel 412 is full. Alternatively, recycle material from full recycle material cartridges that have been stored may be added to the second recycle vessel 416 so that the recycle material may be consumed by the 3D printer 400. The conveyance system may convey recycle material to the dispense vessel 414 from the second recycle vessel 416. Material from the second recycle vessel 416 may be added to the dispense vessel 414 as long as the specified weight or volume ratio of new material to recycle material is maintained.

Figure 5:
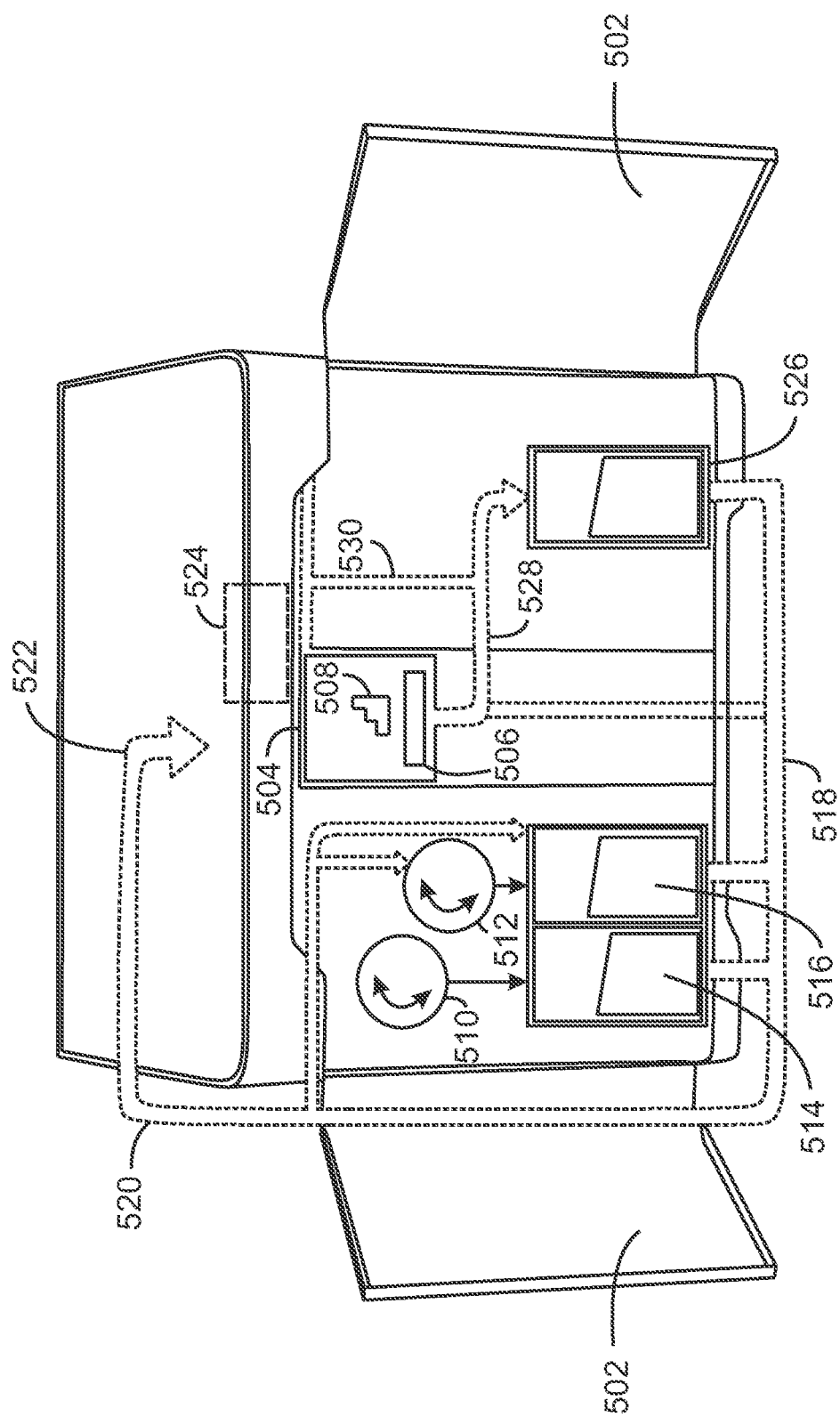
FIG. 5 is a schematic diagram of a 3D printer in accordance with examples of the present techniques.

FIG. 5 is a schematic diagram of a 3D printer in accordance with examples of the present techniques. The 3D printer 500 is shown with its front access panels 502 open and its interior visible. The 3D printer 500 may include a build enclosure 504. The build enclosure 504 may contain a build platform 506 on which a 3D object 508 is formed from feed material composed of new material and recycle material. The 3D printer 500 may also include a new cartridge receiver 510 for receiving a new material cartridge to make the new material available to the 3D printer 500. The 3D printer 500 may include a recycle cartridge receiver 512 for receiving a recycle material cartridge to accept excess material from the build enclosure 504. In addition, the recycle material cartridge may make the recycle material available to the 3D printer 500. The new material cartridge may rotate in the new cartridge receiver 510 to prevent agglomeration of the powdered new material. Likewise, the recycle material cartridge may rotate in the recycle cartridge receiver 512 to prevent agglomeration of the powdered recycle material. The new material cartridge and the recycle material cartridge may be filled or emptied whether the cartridges are rotating or not.

The 3D printer 500 may include a new material vessel 514 to receive new material from the new material cartridge and a recycle material vessel 516 to receive recycle material from the recycle material cartridge. The new material from the new material vessel 514 and the recycle material from the recycle material vessel 516 are fed to leg 518 of a conveyance system. The new material and recycle material may progress from leg 518 to leg 520 and from leg 520 to leg 522. The new material and the recycle material are mixed in-line as they move through the conveyance system 518, 520, 522. From leg 522, the mix of new and recycle material may be supplied to a powder spreader 524 which disperses the mixed material across a surface of the build platform 506 in the build enclosure 504.

As discussed, excess material may be conveyed from the build enclosure 504 to the recycle material cartridge in the recycle cartridge receiver 512. Excess material may also exit the build enclosure 504 and enter a second recycle material vessel 526. Excess material may be transported through piping 528 leaving the bottom of the build enclosure 504 and entering the top of the second recycle material vessel 526. If there is no second recycle material vessel 526, excess material leaving the bottom of the build enclosure 504 may proceed directly to piping 518. Excess material leaving the top of the build enclosure 504 may enter piping 530 which connects with piping 528. As such, excess material leaving the top of the build enclosure 504 may also enter the second recycle material vessel 526.

Figure 6:
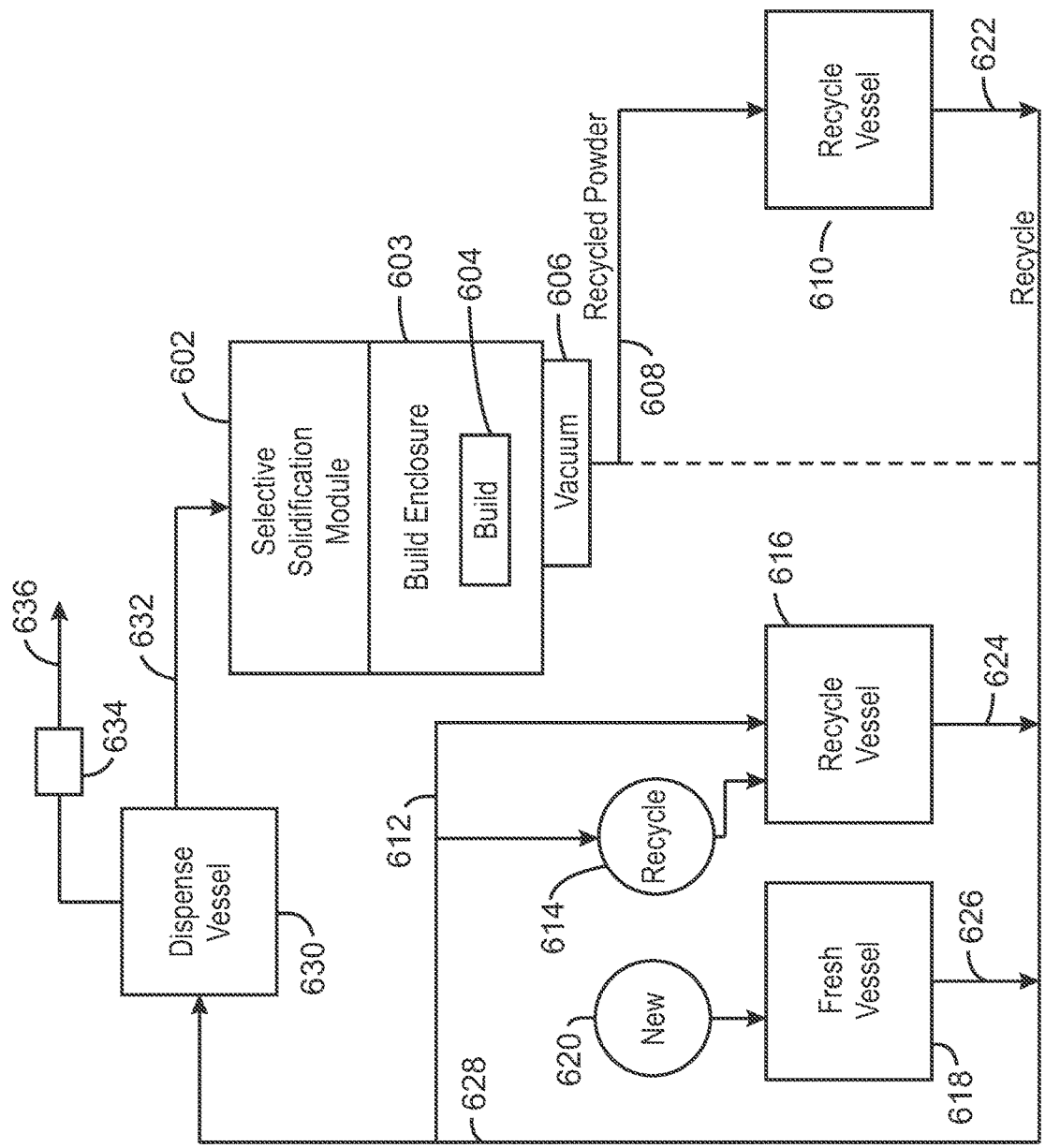
FIG. 6 is a block diagram of a 3D printer in accordance with examples of the present techniques.

FIG. 6 is a block diagram of a 3D printer in accordance with examples of the present techniques. The 3D printer 600 may include a selective solidification module 602 and a build enclosure 603. A build platform 604 may be associated with the build enclosure 603. In some examples, the build enclosure 603 at least partially contains the build platform 604. Feed material (e.g., feed powder) or build material may be provided to the module 602 and/or the build enclosure 603. A vacuum system 606 may withdraw excess material or excess powder (e.g., unused powder) from the build enclosure 603 via piping 608. The vacuum system 606 may include a vacuum pump, a blower, a venturi, or any combination thereof. The piping 608 may transport the excess or recycle material to a recycle material vessel 610. The piping 608 may bypass the recycle material vessel 610 and go directly to the recycle piping. Via piping 612, the recycle material may enter the recycle material cartridge 614 or the recycle material vessel 616. The recycle material vessel 616 may also be provisioned by the recycle material cartridge 614. Likewise, a new material vessel 618 may be supplied by a new material cartridge 620.

A conveying system may remove recycle material from recycle material vessel 610 via piping 622, recycle material from recycle material vessel 616 via piping 624, and new material from new material vessel 618 via piping 626. The new material and recycle material may be mixed to form a feed material as the material is transported by piping 628 to a dispense vessel 630. The dispense vessel 630 may provide the feed material to the selective solidification module 602 via piping 632. Alternatively, the dispense vessel 630 may provide the feed material to the build enclosure 603. A control system may facilitate the feed material composition meeting a specified weight or volume ratio of new material to recycle material. The control system may deliver a specified weight or volume ratio by metering the proper weight or volume of material dispensed from the new material vessel 618 and recycle material vessel 616 before mixing.

At least one vacuum component 634 disposed on top of the dispense vessel 630 may facilitate air movement through the 3D printer 600 if the conveyance system is a pneumatic conveyance system. The vacuum component 634 may be a vacuum pump, a blower, a venturi, or any combination thereof. The air moving through the vacuum component 634 is filtered to remove most of the residual powder. In this manner, the air exiting the vacuum component 634 through piping 636 introduces inconsequential amounts of powder into the environment.

Figure 7:
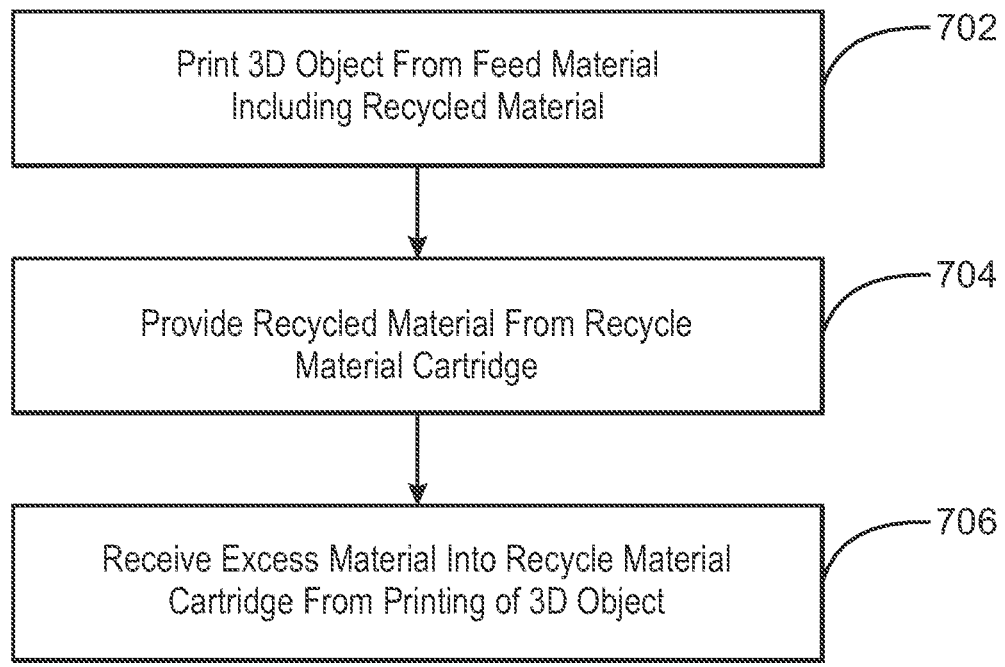
FIG. 7 is a block flow diagram of a method of operating a 3D printer in accordance with examples of the present techniques.

FIG. 7 is a block flow diagram of a method of operating a 3D printer in accordance with examples of the present techniques. At block 702, a 3D object may be printed from feed material that may include recycle material. The recycle material may be excess material unfused or otherwise unused in the 3D printing process. At block 704, the recycle material may be provided by a recycle material cartridge in the 3D printer. Alternatively, a recycle material vessel may provide the recycle material. The recycle material vessel may be disposed below the recycle material cartridge and supplied by the recycle material cartridge. At block 706, excess material from the printing of the 3D object may be received into the recycle material cartridge.

The 3D object may be printed from feed material composed of new material and recycle material. The feed material may have a specified weight or volume ratio of new material to recycle material in a range from zero to 1.0. For example, the ratio may range from 0.01 to 0.99, 0.05 to 0.95, 0.1 to 0.9, 0.15 to 0.85, 0.2 to 0.8, 0.25 to 0.75, 0.3 to 0.7, etc. The new material may be provided by a new material cartridge in the 3D printer. Alternatively, a new material vessel may provide the new material. The new material vessel may be disposed below the new material cartridge and supplied by the new material cartridge.

In 3D printers having a new material vessel and a recycle material vessel, the new material and the recycle material are conveyed from the new material vessel and the recycle material vessel to a build enclosure for printing of a 3D object. The new material and the recycle material are mixed in-line and conveyed to the build enclosure as feed material having the specified weight or volume ratio of new material to recycle material. Instead of being fed directly to the build enclosure, the feed material may be conveyed to a dispense vessel. The dispense vessel may supply feed material to the build enclosure.

Because of the techniques described herein, a 3D printer may select new material, recycle material, or a mix of new material and recycle material as appropriate. The closed loop material handling system may significantly reduce powder lost to the environment. The techniques described herein may not use dedicated resources, floor space, or equipment to mix powder or extract 3D objects from unfused powder.

In addition, the techniques described herein may facilitate handling of recycle material. Recycle material within a 3D printer may be loaded into cartridges and then removed and stored for future use. Furthermore, the techniques described herein may provide a clean method for adding and removing material from the 3D printer. Recycle material may remain free of external contaminants and closed loop material handling may reduce the risk of unknown material entering the 3D printer.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the scope of the present techniques.

What is claimed is:

1. A three-dimensional (3D) printer comprising:
a selective solidification module that selectively solidifies portions of successive layers of a build material on a build platform;
a recycle cartridge receiver that holds a removable recycle material cartridge that accepts material into the removable recycle material cartridge from the 3D printer making recycle material from the removable recycle material cartridge available for the 3D printer to print a 3D object from the recycle material, wherein the removable recycle material cartridge is rotatable within the recycle cartridge receiver to prevent agglomeration of the recycle material in the removable recycle material cartridge;
a new cartridge receiver that holds a new material cartridge making new material from the new material cartridge available for the 3D printer to print the 3D object from the new material; and
an internal storage container that receives the recycle material from the removable recycle material cartridge and makes available material for the 3D printer to print the 3D object.

2. The 3D printer of claim 1, comprising a removable build unit comprising a build enclosure and the build platform, wherein the removable recycle material cartridge comprises an enclosure that contains the recycle material, wherein the recycle cartridge receiver comprises a cavity, receptacle, slot, sleeve, or any combination thereof, and wherein the removable recycle material cartridge in the recycle cartridge receiver accepts the recycle material comprising excess material from the build enclosure.

3. The 3D printer of claim 2, wherein the recycle cartridge receiver comprises a cartridge unloading and refilling mechanism for the recycle material, wherein the 3D printer in printing the 3D object forms the 3D object from the recycle material, and wherein recycle the material comprises powder comprising plastic, polymer, metal, glass, ceramic, or any combination thereof.

4. The 3D printer of claim 1, comprising:
a feed vessel that receives the recycle material made available by the removable recycle material cartridge; and
a powder spreader that receives the recycle material from the feed vessel and disperse the recycle material across a surface of the build platform.

5. The 3D printer of claim 1, wherein the 3D printer feeds material comprising the new material and the recycle material at a specified weight or volume ratio of the new material to the recycle material in a range of 0.2 to 0.8 to a build enclosure for the 3D printer to print the 3D object.

6. The 3D printer of claim 1, comprising:
a new material vessel that receives the new material from the new material cartridge in the new cartridge receiver; and
a first recycle material vessel that receives the recycle material from the removable recycle material cartridge in the recycle cartridge receiver.

7. The 3D printer of claim 6, comprising:
a dispense vessel that receives the new material from the new material vessel, receives the recycle material from the first recycle material vessel, and supplies the new material and the recycle material to a build enclosure; and
a pneumatic conveyance system that conveys the new material from the new material vessel to the dispense vessel and conveys the recycle material from the first recycle material vessel to the dispense vessel.

8. The 3D printer of claim 1, comprising:
a new material vessel that receives the new material from the new material cartridge;
a recycle material vessel that receives the recycle material from the removable recycle material cartridge;
a conveying system that provides a feed material to a dispense system, the feed material comprising the new material from the new material vessel and the recycle material from the recycle material vessel;
a control system that facilitates the feed material comprising a specified weight or volume ratio of the new material to the recycle material; and
the dispense system provides the feed material to a build enclosure.

9. The 3D printer of claim 8, wherein the build platform and the build enclosure are removable, wherein the control system facilitates setting the removable recycle material cartridge to accept the material or to make available the recycle material, wherein the dispense system comprises a dispense vessel, wherein the new material and the recycle material comprise powder, wherein the conveying system comprises a pneumatic conveying system, and wherein the specified weight or volume ratio is in a range of 0.2 to 0.8.

* * * * *